(12) United States Patent
Dan

(10) Patent No.: US 6,631,272 B1
(45) Date of Patent: Oct. 7, 2003

(54) DIRECT DIALING NUMBER REGISTERING METHOD AND APPARATUS

(75) Inventor: Kenichi Dan, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/129,781

(22) Filed: Aug. 6, 1998

(30) Foreign Application Priority Data

| Sep. 5, 1997 | (JP) | ............................................ 9-240650 |
| Sep. 5, 1997 | (JP) | ............................................ 9-240651 |
| Sep. 5, 1997 | (JP) | ............................................ 9-240652 |

(51) Int. Cl.[7] ................................................ H04Q 7/20
(52) U.S. Cl. ......................... 455/460; 455/420; 455/461
(58) Field of Search ................................ 455/462, 557, 455/550, 564, 460, 410, 411, 419, 420, 465, 418; 379/62, 355, 88.01, 88.19, 88.21, 88.27, 200, 188, 204.01, 201.01, 216.01, 211.03, 309; 358/440

(56) References Cited

U.S. PATENT DOCUMENTS

| 4,710,951 A | * | 12/1987 | Itezono ........................ 379/100 |
| 4,920,560 A | * | 4/1990 | Kageyama .................... 379/100 |
| 4,945,557 A | * | 7/1990 | Kaneuchi et al. .............. 379/67 |
| 5,392,340 A | * | 2/1995 | Otsuka ......................... 379/201 |
| 5,509,052 A | * | 4/1996 | Chia et al. ..................... 379/61 |
| 5,583,658 A | * | 12/1996 | Takezawa et al. ........... 358/440 |
| 5,798,845 A | * | 8/1998 | Baek et al. .................. 358/434 |
| 5,812,946 A | * | 9/1998 | Nakabayashi et al. ....... 455/426 |
| 5,875,405 A | * | 2/1999 | Honda ......................... 455/564 |
| 5,963,875 A | * | 10/1999 | Go .............................. 455/564 |
| 6,195,177 B1 | * | 2/2001 | Marechal ..................... 358/434 |

FOREIGN PATENT DOCUMENTS

| JP | 06141116 A | * | 10/1992 | .......... H04M/11/00 |
| JP | 09046505 A | * | 2/1997 | ............ H04N/1/32 |

* cited by examiner

Primary Examiner—Edward F. Urban
Assistant Examiner—C. Chow
(74) Attorney, Agent, or Firm—Oliff & Berridge, PLC

(57) ABSTRACT

Disclosed is a direct dialing number registering method and apparatus including a parent station (facsimile) connected to a communication line and a plurality of child stations (telephones) capable of two-way communication with the facsimile, wherein due to specific identification numbers pre-set for the individual telephones, transmission/reception between the facsimile and a specific telephone can be performed. A direct dialing number for a telephone is registered into the facsimile, before or after the telephone is caused to indicate to a user that the telephone corresponds to the direct dialing number. In another method, the facsimile is set to a dialing number registering mode by operating the facsimile. Then, a telephone for which a dialing number is to be set is caused to transmit its identification number to the facsimile, by operating the telephone. The dialing number of the telephone corresponding to the identification number received by the facsimile is registered into the facsimile. In still another method, the facsimile is set to a dialing number registering mode by causing a telephone, for which a dialing number is to be set, to transmit a registering mode setting signal to the facsimile. The dialing number of the telephone is registered into the facsimile by causing the telephone to transmit the dialing number to the facsimile.

23 Claims, 10 Drawing Sheets

Fig.2

| CHILD STATION NO. | ID NO. | DIRECT DIALING NO. |
|---|---|---|
| | STORAGE UNIT 16 | |
| 1 | ○○○○○○○ | 2464 |
| 2 | ○○○○○○○ | 2465 |
| 3 | ○○○○○○○ | 2838 |
| ⋮ | ⋮ | ⋮ |

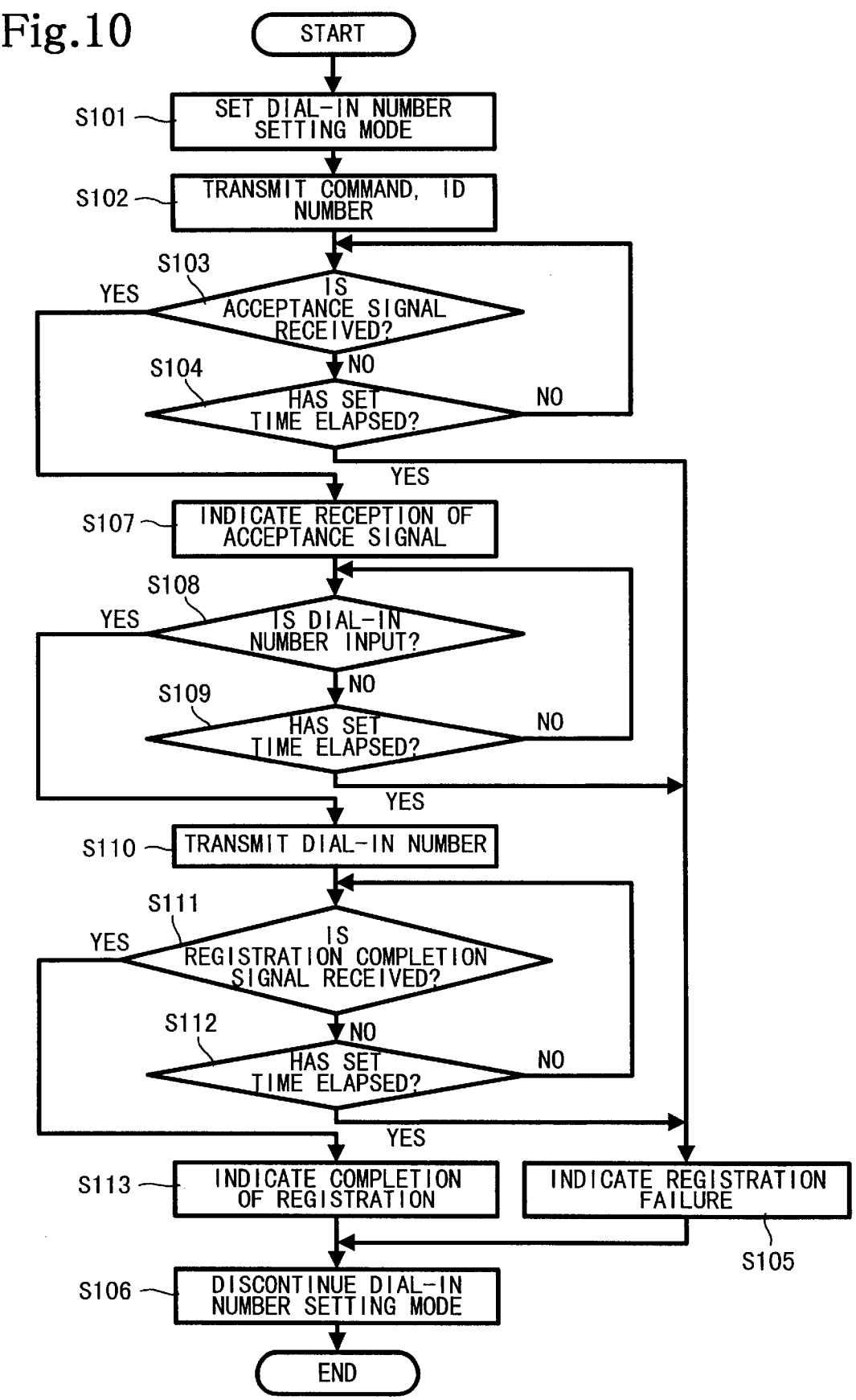

DIRECT DIALING NUMBER REGISTERING METHOD AND APPARATUS

BACKGROUND OF THE INVENTION

1. Field of Invention

The invention relates to a method and apparatus for registering a direct dialing number of each child station in a telephone or facsimile apparatus including a parent station connected to a communication line and a plurality of child stations capable of two-way communication with the parent station, wherein due to specific identification numbers pre-set for the individual child stations, transmission and reception between the parent station and a specific child station can be performed. More particularly, the invention relates to a direct dialing number registering method that, during an operation of registering a direct dialing number, clearly indicates to a user for which child station the user is about to register or has registered a direct dialing number.

2. Description of Related Art

In a conventional telephone or facsimile apparatus including a parent station connected to a public telephone line and plural child stations capable of two-way communication with the parent station, a specific identification number of each child station is pre-set in both the child station and the parent station so that exclusive communication between the parent station and a specific child station is possible. That is, transmission and reception between the parent station and a child station is allowed only upon matching an identification number.

When a direct dialing number system is to be adopted in a telephone or facsimile apparatus having a parent station and plural child stations as described above so that a specific external line signal from the public telephone line will be directly received by a specific child station, it is necessary to assign the individual child stations with different direct dialing numbers (normally defined by the last one to four digits of the telephone number or the like).

Direct dialing numbers for the individual child stations can be set by registering the direct dialing number for each child station in the parent station so as to correspond to the identification number of the child station. The operation of registering direct dialing numbers is performed normally by using only the parent station. For example, after the parent station is set to a registering mode, the direct dialing numbers of child stations are registered by sequentially inputting direct dialing numbers corresponding to child station numbers or identification numbers that are displayed in the parent station.

However, not many users of such telephone or facsimile apparatuses know which child station numbers or identification numbers are set for the individual child stations. Therefore, although the parent station displays child station numbers or identification numbers during registration of direct dialing numbers, the display of child station numbers or identification numbers does not help a user to realize which one of the displayed numbers corresponds to which one of the child stations. Consequently, it is often the case that after completing the operation of registering direct dialing numbers, a user still does not know the correspondence between the registered direct dialing numbers and the child stations.

In such a case, to find out the correspondence between the registered direct dialing numbers and the child stations, the user needs to perform a test call or facsimile transmission to each registered direct dialing number and see which child station responds. Such an operation for checking the setting of direct dialing numbers is troublesome and inefficient.

SUMMARY OF THE INVENTION

Accordingly, it is an object of the invention to provide a direct dialing number registering method that, at the time of registration of direct dialing numbers for plural child stations into a parent station, clearly indicates to a user which child station corresponds to a direct dialing number that is about to be registered or has just been registered.

According to one aspect of the invention, there is provided a direct dialing number registering method in a communication apparatus including a parent station connected to a communication line and a plurality of child stations capable of two-way communication with the parent station, wherein due to specific identification numbers pre-set for the individual child stations, transmission and reception between the parent station and a specific child station can be performed. In the method, a direct dialing number for a child station is registered into the parent station and, in addition, the child station is caused to indicate that the child station corresponds to the direct dialing number.

In the direct dialing number registering method, it is also possible to register the direct dialing number for the child station into the parent station after the child station is caused to indicate that the child station corresponds to the direct dialing number to be registered.

In the direct dialing number registering method, it is also possible to cause the child station to indicate that the child station corresponds to the direct dialing number registered in the parent station after the direct dialing number for the child station is registered into the parent station.

Therefore, the direct dialing number registering method according to the first aspect of the invention makes it possible for a user to recognize which one of the child stations corresponds to which one of the direct dialing numbers, at the time of registration of the direct dialing numbers of the individual child stations.

Unlike the conventional art, the direct dialing number registering method according to the first aspect of the invention eliminates the need to perform a test operation for finding the correspondence between the direct dialing numbers and the child stations after the direct dialing numbers have been registered. Therefore, the operation of registering direct dialing numbers is simplified.

Furthermore, since the method makes is possible for a user to recognize the child station corresponding to a direct dialing number that is to be registered or has been registered, the direct dialing number registering method substantially eliminates the danger of registering a false direct dialing number, and therefore ensures that direct dialing numbers can be registered properly and reliably by performing the registering operation only one time.

According to a second aspect of the invention, there is provided a direct dialing number registering method in a communication apparatus including a parent station connected to a communication line and a plurality of child stations capable of two-way communication with the parent station, wherein due to specific identification numbers pre-set for the individual child stations, transmission and reception between the parent station and a specific child station can be performed. In the method, the parent station is set to a direct dialing number registering mode by an operation performed at the parent station. A child station for which a direct dialing number is to be set is caused to transmit the identification number of the child station to the parent station set in the direct dialing number registering mode, by operation performed at the child station. The direct dialing number of the child station corresponding to the identification number received by the parent station, is registered into the parent station.

In this direct dialing number registering method, after the parent station receives the identification number from a child station operated by a user to transmit the identification number, the direct dialing number of the child station corresponding to the identification number received by the parent station is registered into the parent station. Therefore, the method makes it possible for a user to recognize what direct dialing number is about be registered for a child station that the user actually specifies, in other words, to recognize for which child station the user is about to register a direct dialing number.

Unlike the conventional art, the direct dialing number registering method according to the second aspect of the invention also eliminates the need to perform a test operation for finding the correspondence between the direct dialing numbers and the child stations after the direct dialing numbers have been registered. Therefore, the operation of registering direct dialing numbers becomes simplified.

Furthermore, since the method makes is possible for a user to recognize the child station corresponding to a direct dialing number that is to be registered, the direct dialing number registering method substantially eliminates the danger of registering a false direct dialing number, and therefore ensures that direct dialing numbers can be registered properly and reliably by performing the registering operation only once.

According to a third aspect of the invention, there is provided a direct dialing number registering method in a communication apparatus including a parent station connected to a communication line and a plurality of child stations capable of two-way communication with the parent station, wherein due to specific identification numbers preset for the individual child stations, transmission and reception between the parent station and a specific child station can be performed. In the method, the parent station is set to a direct dialing number registering mode by causing a child station, for which a direct dialing number is to be set, to transmit a direct dialing number registering mode setting signal to the parent station. The direct dialing number of the child station is registered into the parent station by causing the child station to transmit the direct dialing number of the child station to the parent station.

In this direct dialing number registering method, after a child station transmits the direct dialing number registering mode setting signal together with the identification number thereof to the parent station, the direct dialing number of the child station corresponding to the identification number received by the parent station is transmitted from the child station to the parent station, so that the direct dialing number is registered into the parent station. Therefore, the method makes it possible for a user performing the registering operation to recognize what direct dialing number the user is about to register for a child station specified by the user, that is, to recognize for which child station the user is about to register a direct dialing number.

The direct dialing number registering method according to the third aspect of the invention also eliminates the need to perform a test operation for finding the correspondence between the direct dialing numbers and the child stations after the direct dialing numbers have been registered. Therefore, the operation of registering direct dialing numbers becomes simpler.

Furthermore, since the method makes is possible for a user to recognize the child station corresponding to a direct dialing number that is to be registered, the direct dialing number registering method substantially eliminates the danger of registering a false direct dialing number, and therefore ensures that direct dialing numbers can be registered properly and reliably by performing the registering operation only once.

By this method, the parent station can be set to the direct dialing number registering mode by operating a child station. More specifically, a direct dialing number for a child station can be registered into the parent station by operating the child station only, without a need to directly operate the parent station at all. Therefore, the registration operation becomes simple and efficient.

BRIEF DESCRIPTION OF THE DRAWINGS

Preferred embodiments of the present invention will be described in detail with reference to the following figures wherein:

FIG. 2 is an illustration of the memory structure of the parent station shown in FIG. 1;

FIG. 10 is a flowchart illustrating a direct dialing number registering method performed in a child station according to the third embodiment.

DETAILED DESCRIPTION OF PREFERRED EMBODIMENTS

Preferred embodiments of the invention will be described in detail hereinafter with reference to the accompanying drawings.

Figure 1:
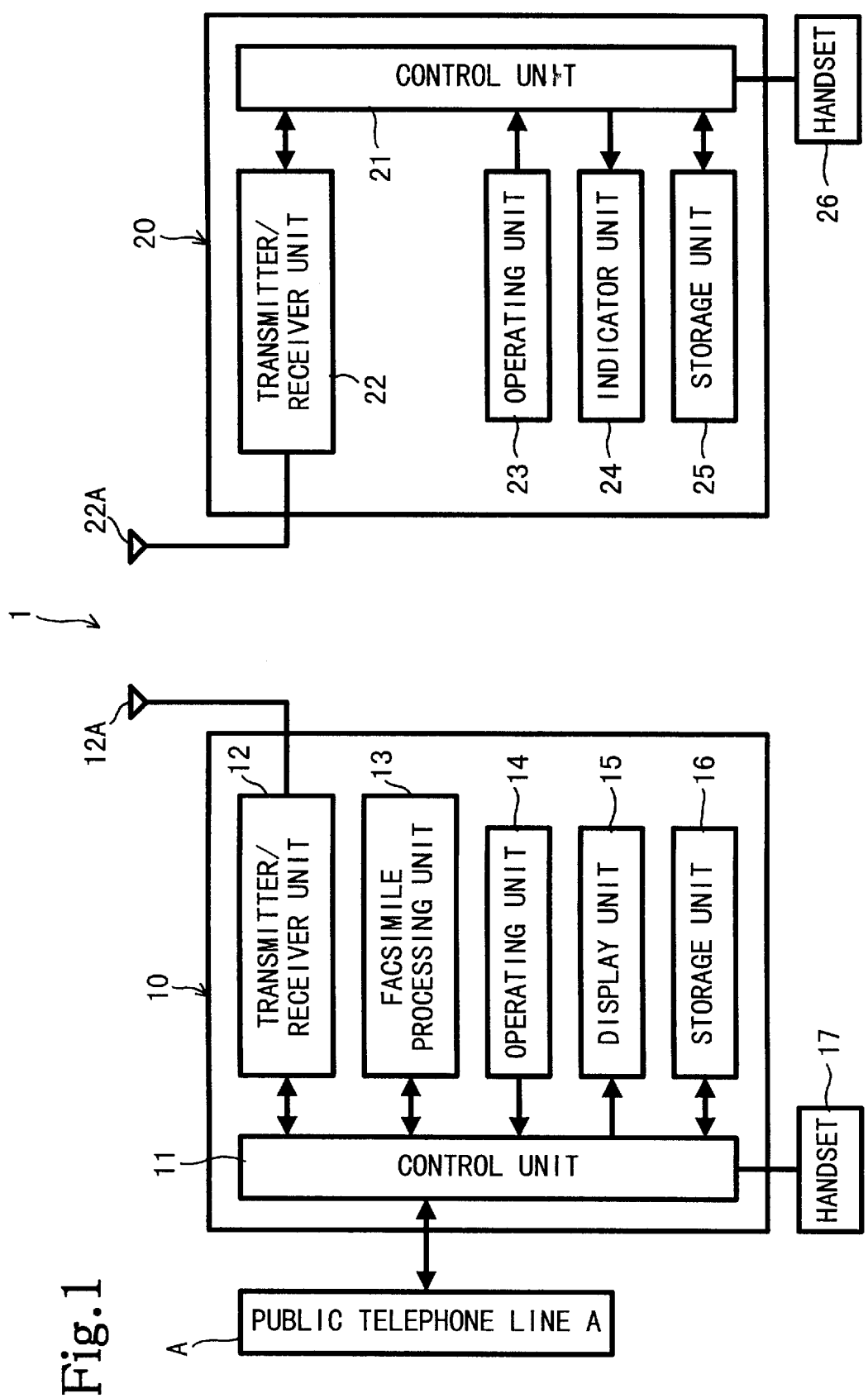
FIG. 1 is a block diagram illustrating a first embodiment of the invention.

A first preferred embodiment of the direct dialing number registering method of the invention will be described with reference to FIGS. 1 through 5. Referring first to FIG. 1, a communication apparatus 1 includes a facsimile apparatus 10, i.e., a parent station, and a plurality of telephones 20, i.e., child stations. Using identification numbers set individually for each of the telephones 20, wireless communication between the parent facsimile 10 and the child telephones 20 can be performed.

The facsimile 10 has a transmitter/receiver unit 12 for performing wireless communication with the telephone 20, and a facsimile processing unit 13 for performing a facsimile function. The facsimile processing unit 13 includes image reader devices, such as a scanner and the like, and recorder devices, such as an ink jet printer and the like. The facsimile 10 further has an operating unit 14 and a display unit 15 that are provided for a user to instruct the facsimile 10 to perform various operations, such as operations related to facsimile processing and the like, and a control unit 11 that is connected to a public telephone line A by a telephone line. The control unit 11 controls the various units described above.

Each of the telephones 20 has a transmitter/receiver unit 22 for performing wireless communication with the facsimile 10 and the other telephones 20, an operating unit 23 for a user to instruct the telephone 20 to perform various operations, such as operations related to telephone calls and the like, an indicator unit 24 for indicating that a direct dialing number is being registered when the registration thereof is actually performed, and a control unit 21 for controlling the various units. The indicator unit 24 also includes a speaker.

In FIG. 1, antennas 12A, 22A are connected to the transmitter/receiver units 12, 22, and handsets 17, 26 are connected to the control units 11, 21, respectively.

The facsimile 10 and the telephones 20 have storage units 16, 25, respectively, which are formed by RAMs, EEPROMs or the like. The storage units 16, 25 store identification numbers. The storage units 16, 25 are designed so that identification numbers can be written thereto by the control unit 11 or the control unit 21 and so that identification numbers can be read therefrom by the control unit 11 or the control unit 21.

The storage unit 16 has areas for storing child station numbers and identification numbers of the child stations corresponding to the child station numbers and, furthermore, areas for storing direct dialing numbers defined by the last one to four digits of the telephone number, corresponding to the child station numbers, as shown in FIG. 2. The storage unit 25 of each child telephone 20 has areas for storing an identification number specific to the telephone 20.

Therefore, for communication between the parent facsimile 10 and a specific child telephone 20, the control unit 11 of the facsimile 10 reads the identification number of that telephone 20 from the storage unit 16, and transmits radio waves containing the identification number. Upon receiving the radio waves, the control unit 21 of each telephone 20 determines whether the identification number from the facsimile 10 matches the identification number of the telephone 20. Only the telephone 20 whose identification number matches the identification number received from the facsimile 10 becomes able to communicate with the facsimile 10.

The parent facsimile 10 is able to set direct dialing numbers in correspondence to the identification numbers of the telephones 20, by registering the direct dialing numbers for the telephones 20 in the facsimile 10, that is, storing the direct dialing numbers for the individual child telephones 20 into the storage unit 16. As a result, a specific external line signal from the public telephone line A will be directly received by a specific telephone 20.

Figure 3:
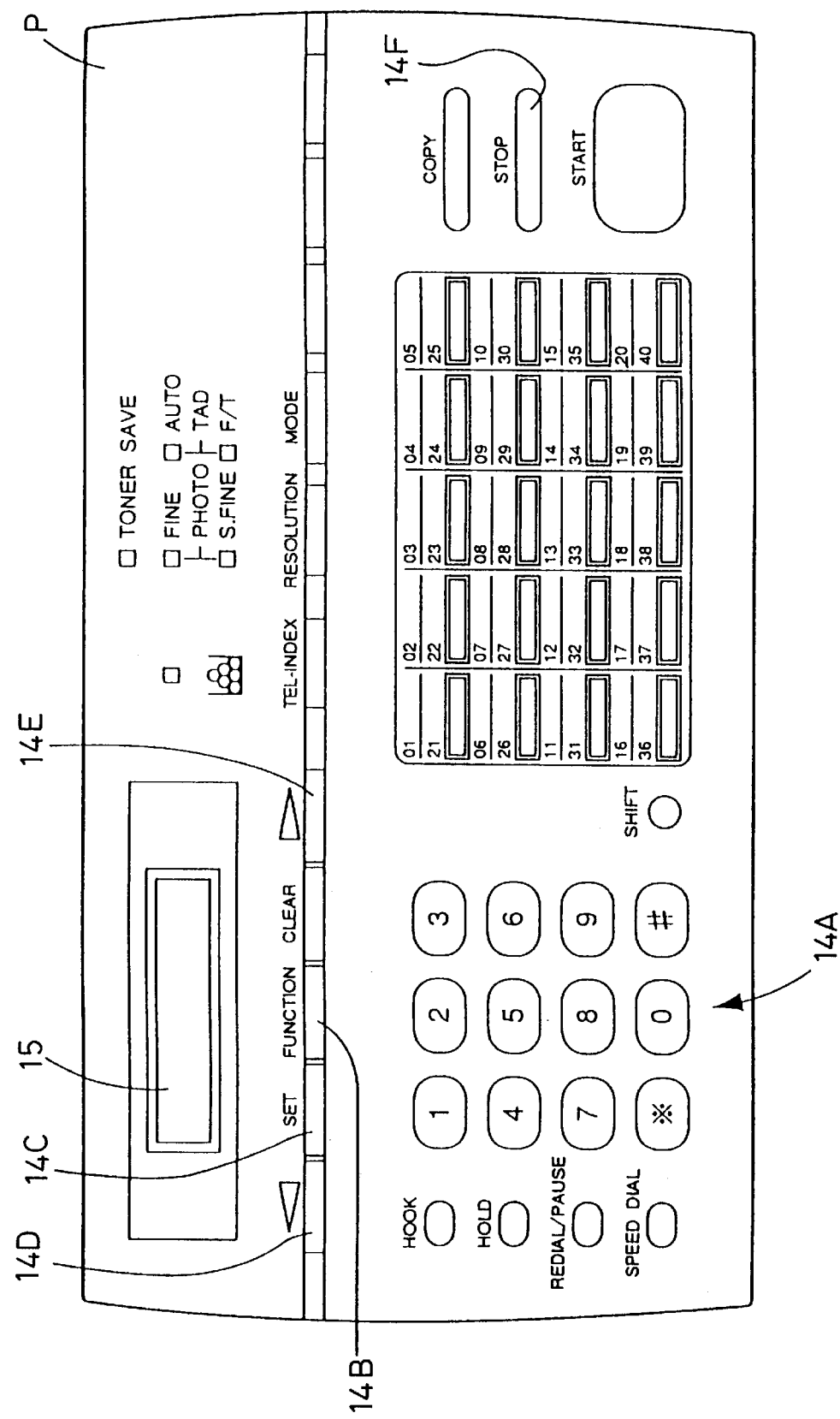
FIG. 3 is a plan view of an operating panel of the parent station.

FIG. 3 shows an operating panel P provided in an upper forward portion of the facsimile 10. Disposed in a rearward portion of the operating panel P is the display unit 15 formed by a liquid crystal display or the like for displaying an operating state or procedure of the facsimile 10 or the like. Disposed in the forward and intermediate portions of the operating panel P are various operation keys that form the operating unit 14, such as numeric keys 14a, a function key 14b, a set key 14c, cursor keys 14d, 14e, a stop key 14f, and the like.

The numeric keys 14a are used to input a facsimile number of the facsimile device to be called. The numeric keys 14a are also used to select various functions of the facsimile 10. The function key 14b is used to instruct the facsimile 10 to start to display information regarding various functions that can be performed by the facsimile 10. A desired function can be selected by operating the numeric keys 14a, the cursor keys 14d, 14e and the like. By depressing the set key 14c when a mode has been selected in the display unit 15 using the cursor key 14d and/or 14e, the mode thus selected is entered.

For example, if "64" is input by using the corresponding numeric keys 14a after the function key 14b has been depressed, the display unit 15 displays "DIAL-IN: ON" or "DIAL-IN: OFF" to indicate whether the facsimile 10 is presently in the direct dialing number registering mode. If the "DIAL-IN: ON" is selected by using the cursor keys 14d, 14e and subsequently the set key 14c is depressed, the facsimile 10 enters the direct dialing number registering mode.

The stop key 14f is used to instruct the control unit 11 to stop the function selecting operation or to instruct the control unit 11 to suspend performance of a function. For example, the stop key 14f is used to discontinue the direct dialing number registering mode.

Figure 4:
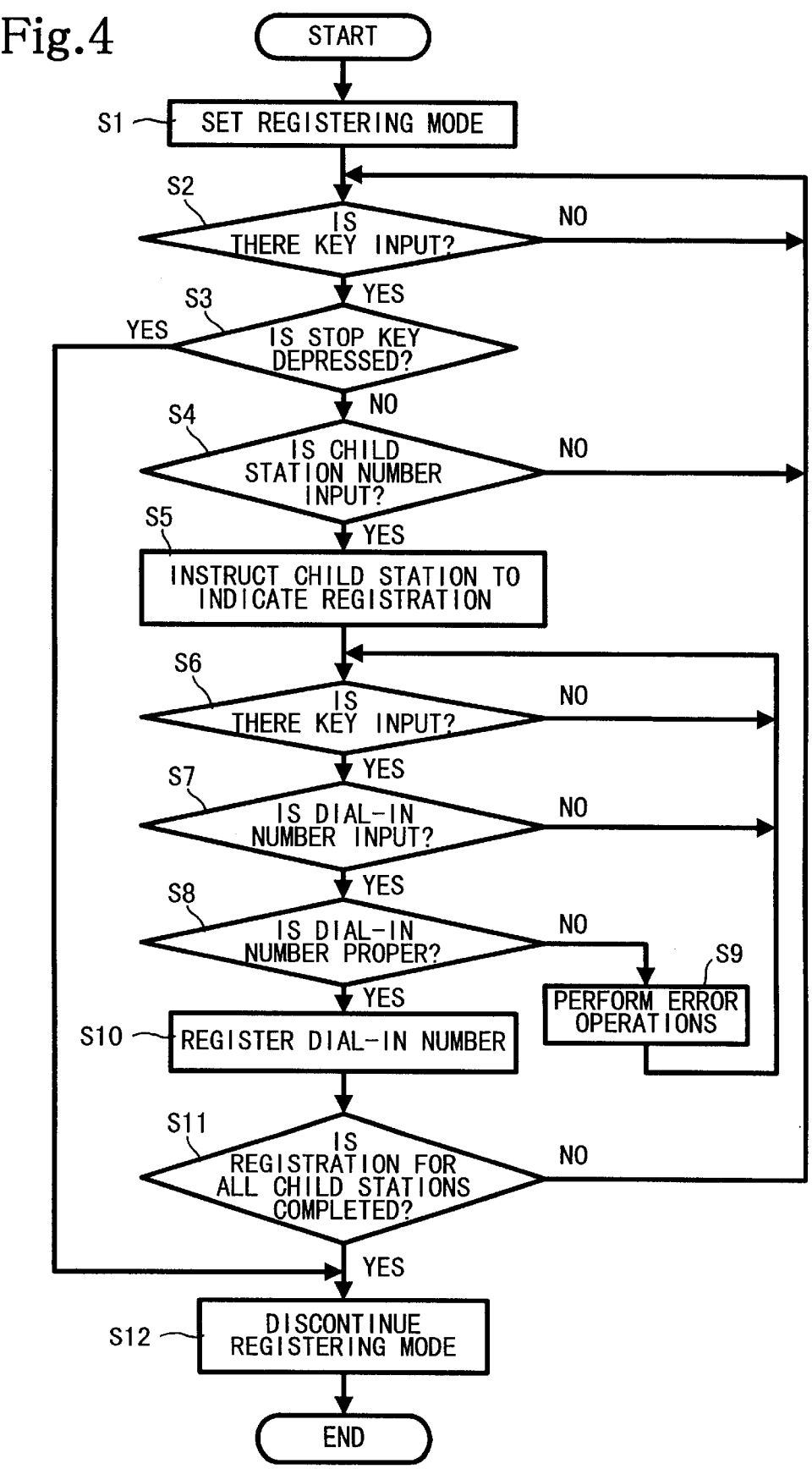
FIG. 4 is a flowchart illustrating a direct dialing number registering method according to the first embodiment.

Next described with reference to FIG. 4 will be a method for registering direct dialing numbers for the individual child telephones 20 into the parent facsimile 10 in the communication apparatus 1.

First, in step S1, the direct dialing number registering mode is entered by operating the function key 14b, the numeric keys 14a and the like. The control unit 11 of the facsimile 10 waits for a key input in step S2. That is, it is determined in step S2 whether there is a key input. If any key is depressed (YES in step S2), it is then determined in step S3 whether the stop key 14f has been depressed. If it is determined in step S3 that the stop key 14f has been depressed (YES), the program operation jumps to step S12. In step S12, the registering mode is discontinued, so that the facsimile 10 becomes a normal reception waiting state.

Conversely, if it is determined in step S3 that the stop key 14f has not been depressed (NO), it is then determined in step S4 whether a child station number has been input. If it is determined that a child station number has been input (YES in step S4), the facsimile 10 sends an indication instructing signal to the telephone 20 corresponding to the input child station number in step S5. Upon receiving the signal, the control unit 21 of the telephone 20 drives the indicator unit 24 so that the telephone 20 rings or sounds for 2 seconds, thereby indicating that the user is about to register a direct dialing number for this telephone 20.

Therefore, by hearing the telephone 20 sound, the user can recognize for which telephone 20 the user is about to register a direct dialing number.

If it is determined in step S4 that a child station number has not been input (NO), the operation returns to step S2, where the control unit 11 waits for another key input. After the indication instructing signal has been transmitted to the child station in step S5, the control unit 11 waits for an input of a direct dialing number for the telephone 20 in step S6. More specifically, in step S6, the control unit 11 determines whether there is a key input. If key operation has been performed (YES in step S6), the control unit 11 determines in step S7 whether a direct dialing number has been input. If a direct dialing number has not been input (NO in step S7), the operation returns to step S6, where the control unit 11 waits for input of a direct dialing number.

Conversely, if it is determined in step S7 that a direct dialing number has been input (YES), the control unit 11 determines in step S8 whether the input direct dialing number is proper, that is, whether the input direct dialing number is different from each of the direct dialing numbers previously input, and whether the input number is a four-digit number, and the like. If it is determined in step S8 that the input direct dialing number is not proper (NO), the control unit 11 executes error operations in step 9. That is, the control unit 11 sounds a buzzer (not shown) provided in the facsimile 10, displays "IMPROPER NUMBER" in the display unit 15, and clears the data concerned. After step S9, the operation returns to step S6, where the control unit 11 waits for input of a direct dialing number.

If it is determined in step S8 that the input direct dialing number is proper (YES), the control unit 11 stores the direct dialing number into the storage unit 16 in step S10, thereby completing the registration of the direct dialing number of the telephone 20. Subsequently in step S11, the control unit 11 determines whether direct dialing numbers have been registered for all the telephones 20, on the basis of the content of the storage unit 16. If it is determined that the registration of direct dialing numbers for all the child telephones 20 has not been completed (NO in step S11), the operation returns to step S2, where the control unit 11 waits for a key input to continue the direct dialing number registering operation for another telephone 20.

If it is determined in step S11 that the registration of direct dialing numbers for all the child telephones 20 has been completed (YES), the registering mode is discontinued in step S12, so that the facsimile 10 returns to a normal reception waiting state.

In the direct dialing number registering method according to this embodiment, the telephone 20 is caused to indicate that the user is about to register a direct dialing number for that telephone 20, before the number is actually registered. However, it is also possible to employ another registering method as illustrated in FIG. 5.

Figure 5:
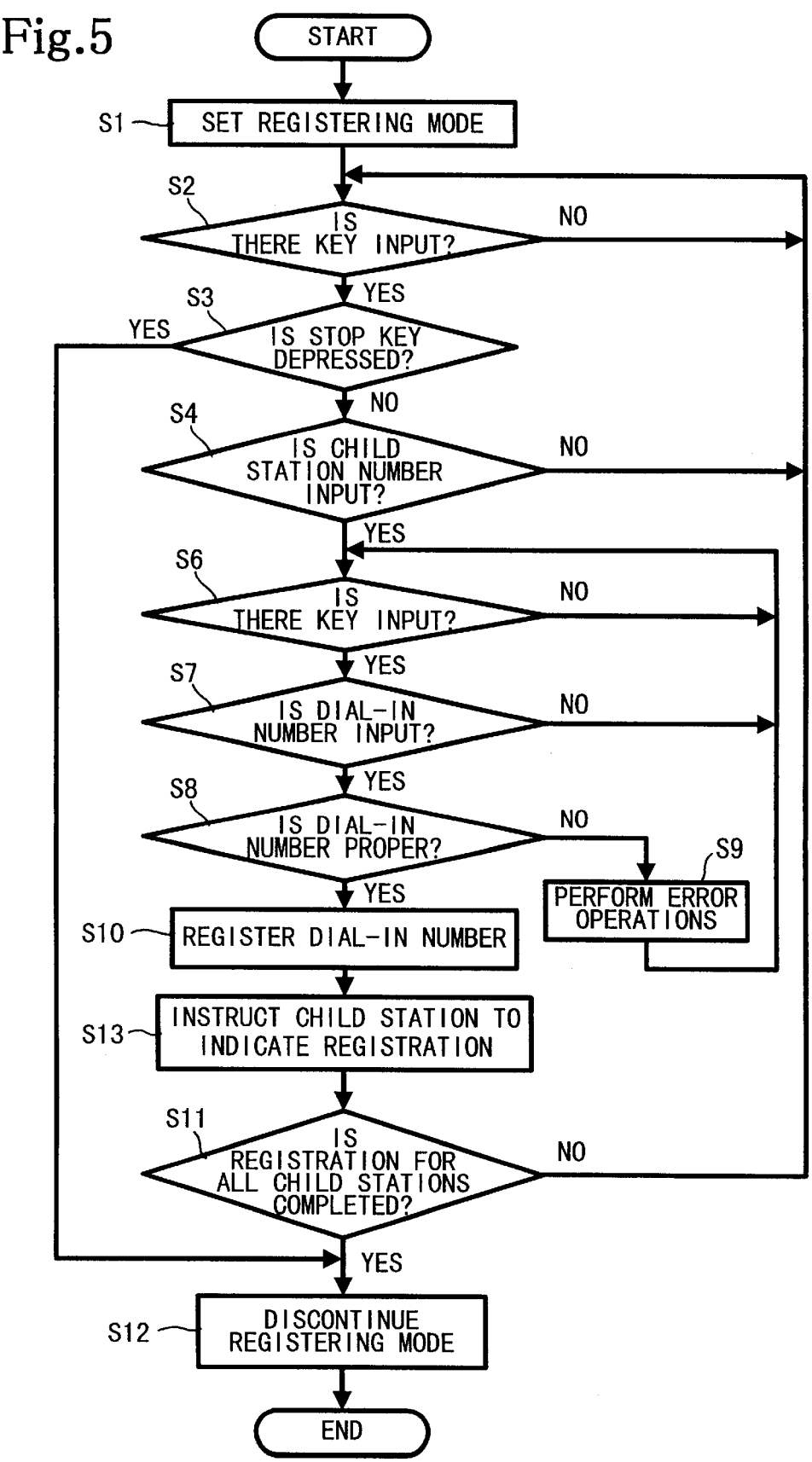
FIG. 5 is a flowchart illustrating another direct dialing number registering method.

The registering method illustrated in FIG. 5 is similar to the registering method described above with reference to FIG. 4. Like steps are represented by like reference characters, and will not be described again. Only the distinguishing steps and features will be described. The indication instructing signal is transmitted in step S5 before a direct dialing number is input in the method illustrated in FIG. 4, whereas in the method illustrated in FIG. 5, an indication instructing signal is transmitted in step S13 after a direct dialing number has been registered in step S10. More specifically, in step S13, the control unit 11 transmits the indication instruction signal to the telephone 20 for which the direct dialing number has been registered, so that the telephone 20 is caused to sound, thereby indicating that the registration of the direct dialing number has been completed for that telephone 20.

Therefore, during registration of direct dialing numbers, a user can recognize to which telephone 20 the direct dialing number that has just been registered corresponds.

In the registering method, after a registering operation for a child station has been completed, the child station is caused to indicate the completion of the registration. This operation may also be applied to the registration of the identification numbers of the child stations, as well as for the registration of direct dialing numbers.

Although in the foregoing embodiment, the indicator unit 24 has a speaker and the indication to a user is achieved by producing sound from the speaker, this indicating manner is not restrictive. For example, the indicator unit 24 may also employ a lamp or the like. In this case, the lamp is turned on or flickered during or after a registering operation.

Although the foregoing embodiment has been described in conjunction with a communication apparatus wherein wireless communication between the parent station and the child stations is possible, it is also possible to apply the registering method of the invention to a communication apparatus wherein the parent station and the child stations are connected by communication lines.

Although in the foregoing embodiment, the parent station is the facsimile 10 and the child stations are the telephones 20, it is also possible to apply the direct dialing number registering methods described above to a communication apparatus wherein all the parent and child stations are telephones, or a communication apparatus wherein all the parent and child stations are facsimiles.

Figure 6:
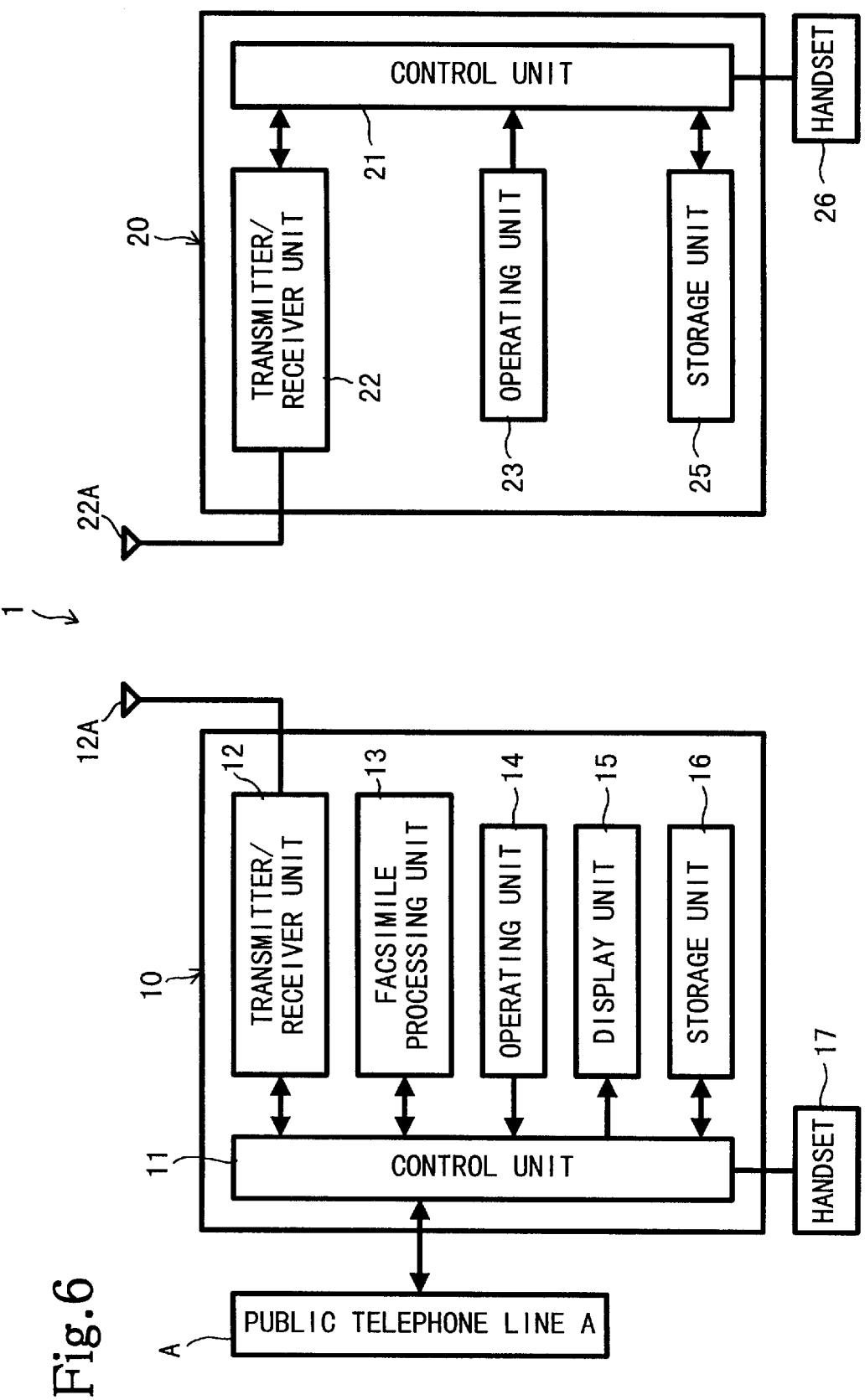
FIG. 6 is a block diagram illustrating a second embodiment of the invention.

A second embodiment of the invention will be described with reference to FIGS. 6, 7 and 8. The construction of communication apparatus 1 according to the second embodiment is similar to that in the first embodiment. In the second embodiment, however, an indicator unit is omitted from each telephone 20, as shown in FIG. 6. Portions and components of the communication apparatus 1 in the second embodiment comparable to those in the first embodiment are represented by comparable reference characters, and will not be described again. The operating unit 23 of the telephone 20 has an "EXTENSION" key (not shown) and an "OUTSIDE LINE" key (not shown) for designating an extension or inside-line communication and outside-line communication, respectively, and numeric keys (not shown) for inputting an outside-line number or an extension number of a communication apparatus to be called, and other various operating keys.

A method for registering direct dialing numbers for the individual child telephones 20 in the parent facsimile 10 in the communication apparatus 1 according to the second embodiment will be described with reference to FIGS. 7 and 8.

Figure 7:
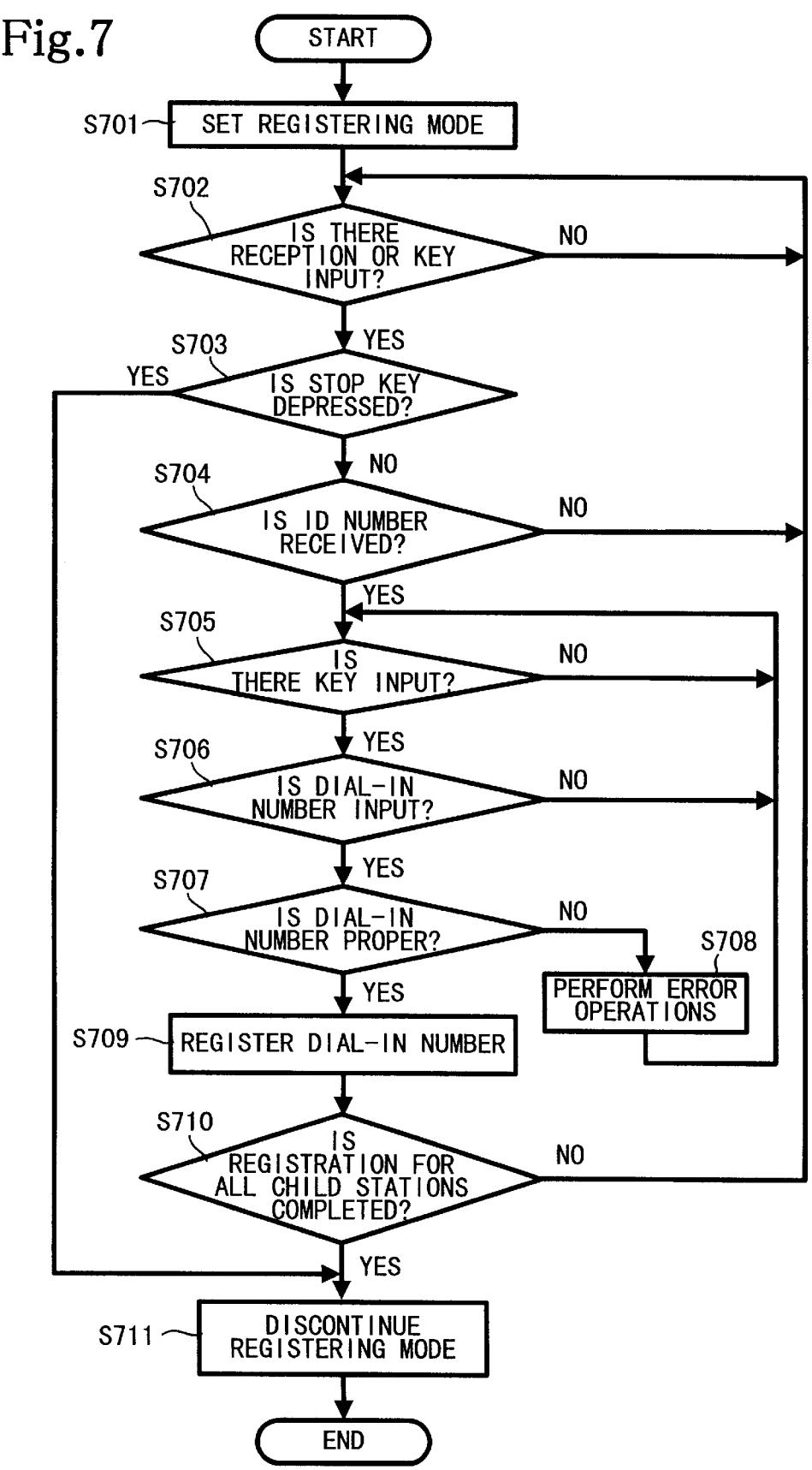
FIG. 7 is a flowchart illustrating a direct dialing number registering method performed in the parent station according to the second embodiment.
Figure 8:
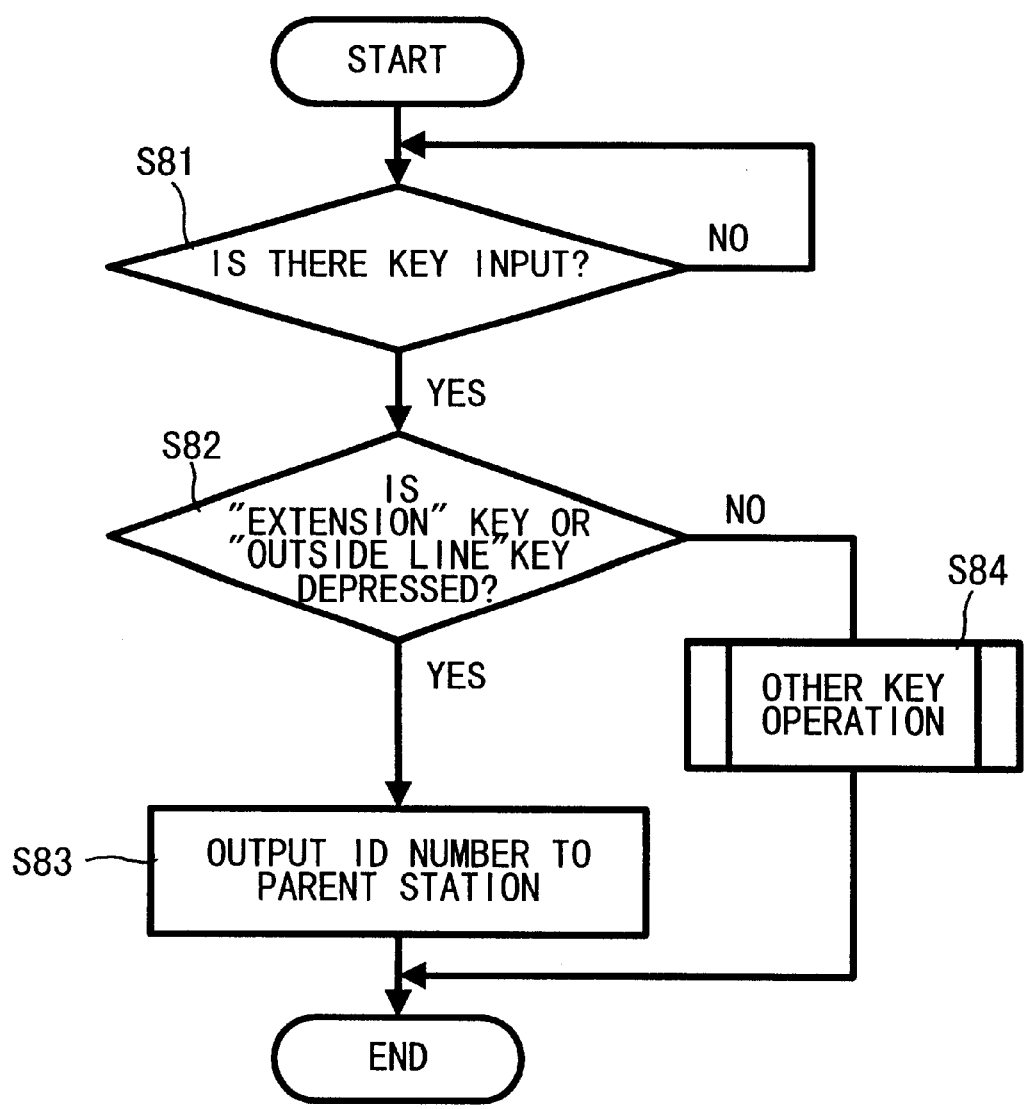
FIG. 8 is a flowchart illustrating a direct dialing number registering method performed in a child station according to the second embodiment.

To register direct dialing numbers into the parent facsimile 10, a user first sets the parent facsimile 10 to a direct dial number registering mode by operating the operating unit 14 of the facsimile 10 in step S701 in FIG. 7. Subsequently in step S702, the facsimile 10 waits to receive a transmission signal from a child station or waits for a key input. Therefore, the facsimile 10 allows input to be made by using the operating keys in the operating unit 14 and becomes able to receive a transmission signal from the telephones 20.

If there is any key input or reception of the transmission signal from a telephone 20 (YES in step S702), it is then determined in step S703 whether the stop key 14f has been depressed. If it is determined that the stop key 14f has been depressed, the operation jumps to step S711, wherein the registering mode is discontinued and the facsimile 10 enters a normal reception waiting state. Conversely, if it is determined in step S703 that the stop key 14f has not been depressed (NO), it is then determined in step S704 whether the facsimile 10 has received an identification number from the child telephone 20. If it is determined that an identification number has not been received (NO in step S704), the operation returns to step S702, where the facsimile 10 enters the reception waiting state and the key input waiting state, again. Conversely, if it is determined in step S704 that the facsimile 10 has received an identification number (YES), the facsimile 10 comes to wait for input of a direct dialing number in step S705.

After confirming that the parent facsimile 10 has entered the direct dialing number registering mode, the user operates the telephone 20 for which a direct dialing number is to be set. As illustrated in the flowchart of FIG. 8, the control unit 21 of a telephone 20 waits for a key input in step S81 by determining whether there is a key input. If there is a key input (YES in step S81), the control unit 21 then determines in step S82 whether the "EXTENSION" key or the "OUTSIDE LINE" key has been depressed. When the user depresses the "EXTENSION" key or the "OUTSIDE LINE" key provided in the operating unit 23 of the telephone 20 for which a direct dialing number is to be set (YES in step S701, YES in step S702 of FIG. 7), the telephone 20 transmits its identification number to the facsimile 10 in step S83.

The identification number transmitted from the telephone 20 for which a direct dialing number is to be set is received by the facsimile 10 (YES in step S702, NO in step S703), so that the determination in step S704 becomes affirmative. Therefore, in step S705, the facsimile 10 enters a state where a direct dialing number for the telephone 20 can be input. When a key is operated (YES in step S705), it is then determined in step S706 whether a direct dialing number has been input. If a direct dialing number is not input (NO in step S706), the operation returns to step S705, where the facsimile 10 enters the key input waiting state.

Conversely, if it is determined in step S706 that a direct dialing number has been input (YES), it is determined in step S707 whether the direct dialing number has been properly input, that is, whether the input direct dialing number is different from each of the direct dialing numbers input previously, and whether the input number is a four-digit number, and the like. If it is determined in step S707 that the input direct dialing number has not been properly input (NO), the control unit 11 executes error indication operations in step S708. That is, the control unit 11 sounds a buzzer (not shown) provided in the facsimile 10, displays "IMPROPER NUMBER" in the display unit 15, and clears the data concerned. After step S708, the operation returns to step S705, where the control unit 11 waits for input of a direct dialing number.

If it is determined in step S707 that the input direct dialing number is proper (YES), the control unit 11 stores the direct dialing number into the storage unit 16 in step S709, thereby completing the registration of the direct dialing number of the telephone 20. Subsequently in step S710, the control unit 11 determines whether direct dialing numbers have been registered for all the telephones 20, on the basis of the content of the storage unit 16. If it is determined that the registration of direct dialing numbers for all the child telephones 20 has not been completed (NO in step S7100), the operation returns to step S702, where the control unit 11 waits for a key input to continue the direct dialing number registering operation for another telephone 20.

If it is determined in step S710 that the registration of direct dialing numbers for all the child telephones 20 has been completed (YES), the registering mode is discontinued in step S711, so that the facsimile 10 returns to the normal reception waiting state.

If it is determined in step S10 that the registration of direct dialing numbers for all the child telephones 20 has been completed (YES), the registering mode is discontinued in step S11, so that the facsimile 10 returns to the normal reception waiting state.

In the direct dialing number registering method according to the second embodiment, before a direct dialing number is registered into the parent facsimile 10, the child telephone 20 for which the direct dialing number is to be registered is operated so as to transmit the identification number of the telephone 20 to the parent facsimile 10. Therefore, at the time of registration of a direct dialing number, it is possible for a user to recognize for which telephone 20 the user is about to register the direct dialing number.

A third embodiment of the invention will be described. The construction of the communication apparatus 1 in the third embodiment is substantially the same as that in the first embodiment illustrated in FIG. 1, and will not be described again. In the communication apparatus 1 in the third embodiment, the parent facsimile 10 can be set to the registering mode not only by operating the parent facsimile 10, but also by operating a child telephone 20 so as to transmit a registering mode setting command to the facsimile 10. That is, the parent station can be set to the registering mode without directly operating the parent station. Furthermore, by transmitting a direct dialing number for the telephone 20 to the facsimile 10 after transmitting the registering mode setting command to the facsimile 10 from the same telephone 20, the direct dialing number of the telephone 20 can be registered into the facsimile 10, that is, the parent station.

Figure 9:
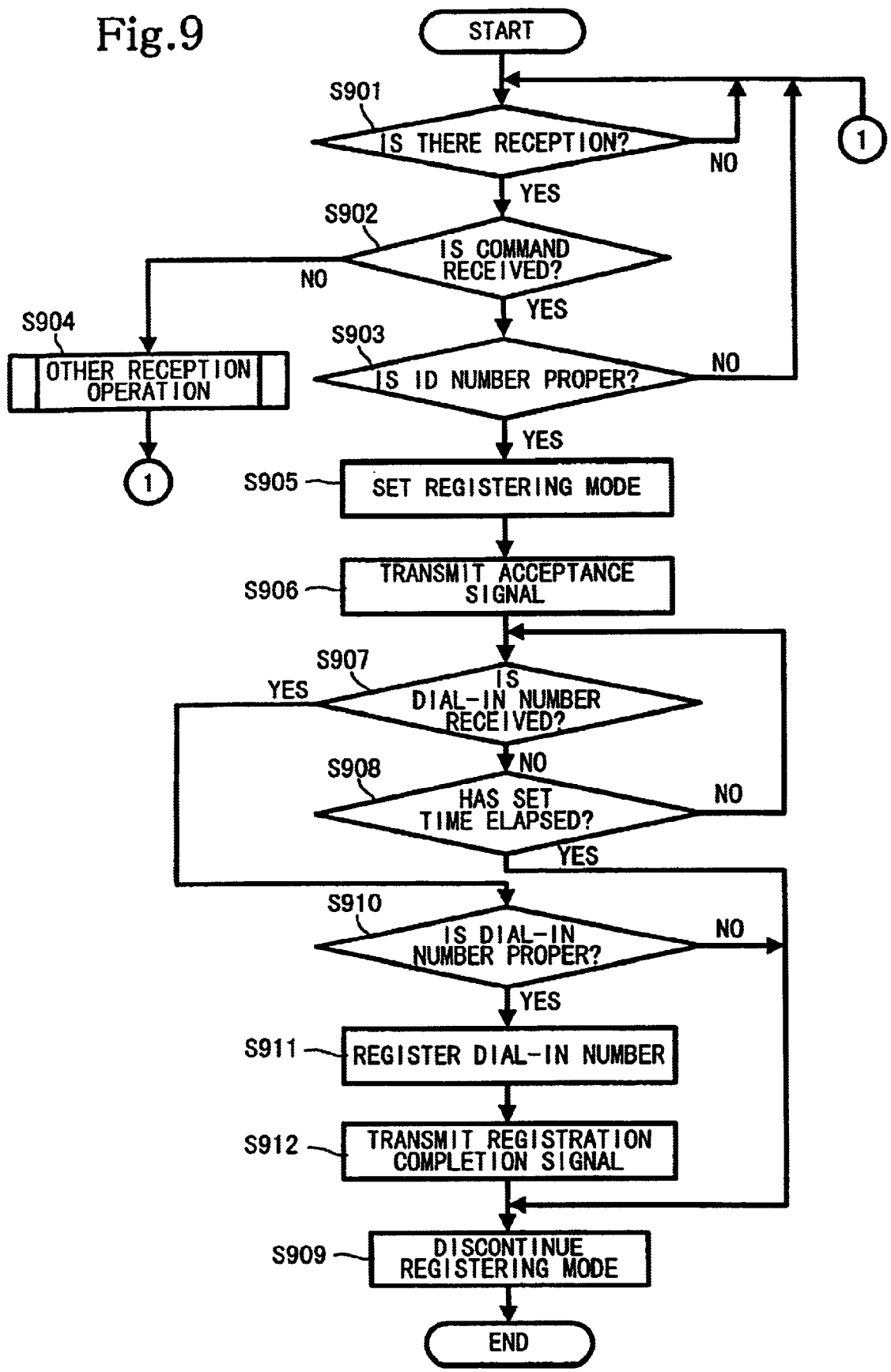
FIG. 9 is a flowchart illustrating a direct dialing number registering method performed in the parent station according to a third embodiment.

A method for registering direct dialing numbers to be set for the individual child telephone 20 into the parent facsimile 10 in the communication apparatus 1 according to the third embodiment will be described with reference to FIGS. 9 and 10. FIG. 9 shows a flowchart illustrating a direct dialing number registering operation performed on the side of the parent facsimile 10. FIG. 10 shows a flowchart illustrating a direct dialing number registering operation performed on the side of the child telephones 20.

When "*64" is inputted by operating the operating unit 23 of a child telephone 20 for which a direct dialing number is going to be set while the parent facsimile 10 is in the reception waiting state (that is, in step S901 in FIG. 9), the registering operation is initiated in the child telephone 20. First, the direct dialing number setting mode is set in the telephone 20 in step S101 in FIG. 10. Subsequently in step S102, the direct dialing number registering mode setting command and the identification number of the telephone 20 are transmitted from the child telephone 20 to the parent facsimile 10. In step S103, the telephone 20 waits to receive an acceptance signal from the facsimile 10 (reception waiting state).

For the parent station, when the facsimile 10 receives the direct dialing number registering mode setting command and the identification number of the telephone 20, it is determined in step S901 in FIG. 9 that there is reception (YES). Subsequently in step S902, it is determined whether the registering mode setting command has been received from a child station. Since the registering mode setting command has been received from the child telephone 20 in this case (YES in step S902), it is then determined in step S903 whether the identification number of the child station matches an identification number registered in the parent station. In a case where it is determined in step S902 that the registering mode setting command has not been received from a child station, a reception operation suitable for the reception is performed in step S904, and the program operation returns to step S901. Thus, the facsimile 10 enters the reception waiting state again, where facsimile transmission and reception can be performed.

If it is determined in step S903 that the received identification number is different from each of the registered identification numbers of the child stations (NO in step S903), the operation returns to step S901, where the reception waiting state is assumed so that the facsimile transmission and reception can be performed. Conversely, if it determined in step S903 that the received identification number matches the identification number of the child station registered in the parent station (YES in step S903), the parent station is set to the direct dialing number registering mode in step S905. Subsequently in step S906, the acceptance signal is transmitted to the child station.

For the child telephone 20, it is determined in step S104 in FIG. 10 whether a predetermined length of time (for example, 5 seconds) has elapsed following the assumption of the acceptance signal reception waiting state (step S103), that is, whether the predetermined length of time has elapsed before reception of the acceptance signal from the parent station. If the predetermined length of time has elapsed without reception of the acceptance signal (YES in step S104), the telephone 20 indicates that the registering operation was not successful, by the indicator unit 24 producing sound (for example, continual chirping sounds) in step S105. Subsequently in step S106, the direct dialing number setting mode is discontinued, so that the telephone 20 enters the normal state where a telephone call is possible.

If the acceptance signal from the parent station is received within the predetermined length of time (YES in step S103), the telephone 20 indicates that the acceptance signal has been received, by the indicator unit 24 producing sound (for example, a short whistling sound) in step S107. Therefore, it is indicated to the user that the parent station has become ready to receive a direct dialing number to be set for the child station. Subsequently in step S108, the telephone 20 enters a state where the telephone 20 waits for input of a direct dialing number. In step S109, it is determined whether a predetermined length of time (for example, 15 seconds) has elapsed following the assumption of the direct dialing number input waiting state, that is, whether the predetermined length of time has elapsed without input of a direct dialing number. If the predetermined length of time has elapsed without input of a direct dialing number (YES in step S109), the operation proceeds to step S105, where the indicator unit 24 produces sound (for example, continual chirping sounds) to indicate that the registering operation was not successful. Subsequently in step S106, the direct dialing number setting mode is discontinued, so that the normal call-possible state is assumed.

If it is determined in step S108 that a direct dialing number has been input within the predetermined length of time (YES in step S108), the input direct dialing number is transmitted to the parent station in step S110. Subsequently in step S111, the telephone 20 waits to receive a registration completion signal from the parent station.

On the side of the parent station, it is determined in step S908 in FIG. 9 whether a predetermined length of time (for example, 20 seconds) has elapsed following the assumption of the direct dialing number reception waiting state (step S907), that is, whether the predetermined length of time has elapsed without reception of a direct dialing number transmitted by the child station. If the predetermined length of time has elapsed without reception of a direct dialing number (YES in step S908), the registering mode is discontinued in step S909, so that the facsimile 10 enters the normal facsimile transmission/reception-possible state.

If it is determined in step S907 that a direct dialing number from the child station has been received within the predetermined length of time (YES in step S907), it is then determined in step S910 whether the received direct dialing number is proper, that is, whether the received direct dialing number is different from each of the direct dialing numbers registered in the facsimile 10, and whether the received number is a four-digit number, and the like. If it is determined the received direct dialing number is not proper (NO in step S910), the registering mode is discontinued in step S909, so that the facsimile 10 enters the normal facsimile transmission/reception-possible state.

If it is determined in step S910 that the received direct dialing number is proper (YES in step S910), the control unit 11 stores the direct dialing number into the storage unit 16 in step S911, thereby registering the direct dialing number of the child telephone 20. After the registration completion signal is transmitted to the child station in step S912, the registering mode is discontinued in step S909, so that the telephone 20 enters the normal facsimile transmission/reception-possible state.

For the child station, it is determined in step S112 in FIG. 10 whether a predetermined length of time (for example, 5 seconds) has elapsed following the assumption of the registration completion signal reception waiting state (step S11), that is, whether the predetermined length of time has elapsed without reception of the registration completion signal from the parent station. If the registration completion signal is received within the predetermined length of time (YES in step S11), the telephone 20 indicates that the registration is completed, by the indicator unit 24 producing sound (for example, a short whistling sound) in step S113. Subsequently in step S106, the direct dialing number setting mode is discontinued. The registering operation thus ends.

If the predetermined length of time has elapsed without reception of the registration completion signal (YES in step S112), the telephone 20 indicates that the registering operation was not successful, by the indicator unit 24 producing sound (for example, continual chirping sounds) in step S105. Subsequently in step S106, the direct dialing number setting mode is discontinued, so that the telephone 20 enters the normal call-possible state.

In the manner as described above, the direct dialing number of the child telephone 20 has been registered. If registration of a direct dialing number of another telephone 20 is to be performed, the operation described above is performed again.

In the direct dialing number registering method of the third embodiment, when a direct dialing number is to be registered into the facsimile 10, i.e., the parent station, a child telephone 20 for which the direct dialing number is to be set is operated so as to transmit the direct dialing number registering mode setting command and the direct dialing number of the telephone 20 to the parent facsimile 10. Therefore, the method makes is possible for a user performing registration to recognize for which telephone 20 the user is about to register a direct dialing number. Furthermore, the operation of registering a direct dialing number can be performed by operating the child station only, without directly operating the parent station at all. Therefore, the registration can be efficiently performed.

Although in the foregoing embodiments, the indicator unit 24 has a speaker and the status of registering operation is indicated to a user performing the operation by sounding the speaker, this indicating manner is not restrictive. For example, the indicator unit 24 may also be employ a lamp or the like. In this case, the lamp is turned on or flickered to indicate the status of registering operation.

It is to be understood that the invention is not restricted to the particular forms shown in the foregoing embodiments.

Various modifications and alternations can be made thereto without departing from the scope of the invention.

What is claimed is:

1. A direct dialing number registering method for registering direct dialing numbers in a communication apparatus, the communication apparatus including a parent station connected to a communication line and a plurality of child stations capable of two-way communication with the parent station, wherein due to specific identification numbers pre-set for the individual child stations, transmission and reception between the parent station and a specific child station can be performed, comprising the steps of:

setting the parent station to a direct dialing number registering mode;

selecting a pre-set specific identification number to define a child station for which a direct dialing number is to be registered into the parent station;

causing the defined child station to indicate that the child station corresponds to the pre-set specific identification number, enabling a user to recognize which one of the child stations corresponds to which one of the pre-set specific identification numbers, at the time of selection of the pre-set specific identification numbers of the individual child stations;

inputting the direct dialing number for the child station defined by the pre-set specific identification number; and registering the direct dialing number for the defined child station corresponding to the pre-set specific identification number into the parent station.

2. The direct dialing number registering method according to claim 1, further comprising the step of:

after the direct dialing number for the child station is registered into the parent station, causing the child station to indicate that the child station corresponds to the direct dialing number registered in the parent station.

3. The direct dialing number registering method according to claim 1, wherein the setting the parent station to the direct dialing number registering mode by an operation is performed at the parent station.

4. The direct dialing number registering method according to claim 1, wherein the setting the parent station to the direct dialing number registering mode is by causing the child station, for which the direct dialing number is to be set, to transmit a direct dialing number registering mode setting signal to the parent station.

5. The direct dialing number registering method according to claim 4, wherein the inputting the direct dialing number for the defined child station by an operation is performed at the child station; and the registering the direct dialing number of the child station into the parent station is by causing the child station to transmit the direct dialing number of the child station to the parent station.

6. A direct dialing number registration apparatus that registers direct dialing numbers in a communication apparatus, the communication apparatus including a parent station connected to a communication line and a plurality of child stations capable of two-way communication with the parent station, wherein due to specific identification numbers pre-set for the individual child stations, transmission and reception between the parent station and a specific child station can be performed, comprising:

setting means for setting the parent station to a direct dialing number registering mode;

selecting means for selecting a pre-set specific identification number to define a child station for which a direct dialing number is to be registered into the parent station;

indicating means for causing the child station to indicate that the child station corresponds to the pre-set specific identification number, enabling a user to recognize which one of the child stations corresponds to which one of the pre-set specific identification numbers, at the time of selection of the pre-set specific identification numbers of the individual child stations;

inputting means for inputting the direct dialing number for the child station defined by the pre-set specific identification number; and registering means for registering the direct dialing number for the defined child station corresponding to the pre-set specific identification number into the parent station.

7. The direct dialing number registration apparatus according to claim 6, wherein after the registration means registers the direct dialing number for the child station into the parent station, the indicating means also causes the child station to indicate that the child station corresponds to the direct dialing number registered in the parent station.

8. The direct dialing number registration apparatus according to claim 6, further comprising:

transmitting means for causing a child station for which the direct dialing number is to be set to transmit an identification number of the child station to the parent station set in the direct dialing number registering mode, by an operation performed at the child station.

9. The direct dialing number registration apparatus according to claim 8, wherein the registering means registers into the parent station, the direct dialing number of the child station corresponding to the identification number received by the parent station.

10. The direct dialing number registration apparatus according to claim 6, wherein the setting means for setting the parent station to the direct dialing number registering mode is by causing the child station, for which the direct dialing number is to be set, to transmit a direct dialing number registering mode setting signal to the parent station.

11. The direct dialing number registration apparatus according to claim 10, wherein the inputting means for inputting the direct dialing number for the defined child station by an operation is performed at the child station, and the registering means registers the direct dialing number of the child station into the parent station after transmitting means causes the child station to transmit the direct dialing number of the child station to the parent station.

12. A direct dialing number registration apparatus that registers direct dialing numbers in a communication apparatus, the communication apparatus including a parent station connected to a communication line and a plurality of child stations capable of two-way communication with the parent station, wherein due to specific identification numbers pre-set for the individual child stations, transmission and reception between the parent station and a specific child station can be performed, comprising:

a memory; and a control unit that sets the parent station to a direct dialing number registering mode, selects a pre-set specific identification number to define a child station for which a direct dialing number is to be registered into the parent station, causes the defined child station to indicate that the child station corresponds to the pre-set specific identification number, enabling a user to recognize which one of the child stations corresponds to which one of the direct dialing numbers, at the time of selection of the pre-set specific identification numbers of the individual child stations, receives the direct dialing number for the child station defined by the pre-set specific identification number, and registers the direct dialing number for the defined child station corresponding to the pre-set specific identification number into the parent station.

13. The direct dialing number registration apparatus according to claim 12, wherein after the control unit registers the direct dialing number for the child station into the parent station, the control unit also causes the child station to indicate that the child station corresponds to the direct dialing number registered in the memory.

14. The direct dialing number registration apparatus according to claim 12, wherein the control unit sets the parent station to the direct dialing number registering mode by an operation performed at the parent station, causes the child station for which the direct dialing number is to be set to transmit an identification number of the child station to the parent station set in the direct dialing number registering mode, by an operation performed at the child station, and registers into the parent station, the direct dialing number of the child station corresponding to the identification number received by the parent station.

15. A direct dialing number registering method for registering direct dialing numbers in a communication apparatus, the communication apparatus including a parent station connected to a communication line and a plurality of child stations capable of two-way communication with the parent station and capable of two-way communication with an external communication apparatus only through the parent station, wherein due to specific identification numbers pre-set for the individual child stations, transmission and reception between the parent station and a specific child station can be performed and wherein the external apparatus, based on a direct dialing number, directly rings only a child station corresponding to the direct dialing number through the parent station, comprising the steps of:

setting the parent station to a direct dialing number registering mode;

selecting a pre-set specific identification number to define a child station for which a direct dialing number is to be registered into the parent station;

inputting the direct dialing number for the child station defined by the pre-set specific identification number;

registering the direct dialing number peculiar to each child station corresponding to the pre-set specific identification number into the parent station; and causing only the child station, corresponding to the direct dialing number to be registered at the parent station, to indicate that the child station corresponds to the direct dialing number, enabling a user to recognize which one of the child stations corresponds to which one of the direct dialing numbers, at the time of registration of the direct dialing numbers of the individual child stations.

16. A direct dialing number registration apparatus that registers direct dialing numbers in a communication apparatus, the communication apparatus including a parent station connected to a communication line and a plurality of child stations capable of two-way communication with the parent station and capable of two-way communication with an external communication apparatus only through the parent station, wherein due to specific identification numbers pre-set for the individual child stations, transmission and reception between the parent station and a specific child station can be performed and wherein the external apparatus, based on a direct dialing number, directly rings only a child station corresponding to the direct dialing number through the parent station, comprising:

setting me for setting the parent station to a direct dialing number registering mode;

selecting means for selecting a pre-set specific identification number to define a child station for which a direct dialing number is to be registered into the parent station;

inputting means for inputting the direct dialing number for the child station defined by the pre-set specific identification number;

registering means for registering the direct dialing number peculiar to each child station corresponding to the pre-set specific identification number into the parent station; and indicating means for causing only the child station, corresponding to the direct dialing number to be registered at the parent station, to indicate that the child station corresponds to the direct dialing number, enabling a user to recognize which one of the child stations corresponds to which one of the direct dialing numbers, at the time of registration of the direct dialing numbers of the individual child stations.

17. A direct dialing number registration apparatus that registers direct dialing numbers in a communication apparatus, the communication apparatus including a parent station connected to a communication line and a plurality of child stations capable of two-way communication with the parent station and capable of two-way communication with an external communication apparatus only through the parent station, wherein due to specific identification numbers pre-set for the individual child stations, transmission and reception between the parent station and a specific child station can be performed and wherein the external apparatus, based on a direct dialing number, directly rings only a child station corresponding to the direct dialing number through the parent station, comprising:

a memory; and a control unit that sets the parent station to a direct dialing number registering mode, selects a pre-set specific identification number to define a child station for which a direct dialing number for the child station is defined by the pre-set specific identification number, registers the direct dialing number peculiar to each child station corresponding to the pre-set specific identification number into the memory, and causes only the child station, corresponding to the direct dialing number to be registered at the parent station, to indicate that the child station corresponds to the direct dialing number, enabling a user to recognize which one of the child stations corresponds to which one of the direct dialing numbers, at the time of registration of the direct dialing numbers of the individual child stations, and returns the parent station to the reception waiting mode when registration of the direct dialing numbers for all of the individual child stations is completed.

18. A communication apparatus including a parent station connected to a communication line and a plurality of child stations capable of two-way communication with the parent station, and capable of two-way communication with an external communication apparatus only through the parent station, wherein due to specific identification numbers pre-set for the individual child stations, transmission and reception between the parent station and a specific child station can be performed, comprising:

selecting means for selecting a pre-set specific identification number to define a child station for which specific data are to be registered into the parent station;

indicating means for causing only the child station, corresponding to the pre-set identification number to be selected by the selecting means, to indicate that the child station corresponds to the pre-set identification number when the pre-set identification number is selected by the selecting means;

inputting means for inputting data specific to the child station defined by the pre-set specific identification number; and registering means for registering the data for the defined child station corresponding to the pre-set specific identification number into the parent station.

19. A communication apparatus including a parent station connected to a communication line and a plurality of child stations capable of two-way communication with the parent station, and capable of two-way communication with an external communication apparatus only through the parent station, wherein due to specific identification numbers pre-set for the individual child stations, transmission and reception between the parent station and a specific child station can be performed, comprising:

first transmitting means for transmitting a registering mode setting command and the specific identification number pre-set for the child station from the child station to the parent station to set a registering mode, into the parent station, capable of registering data peculiar to each child station corresponding to the pre-set specific identification number into the parent station;

setting means for setting the parent station into the registering mode when the registering mode setting command is received from the child station;

second transmitting means for transmitting data peculiar to each child station into the parent station; and storing means for storing data peculiar to each child station received from the child station corresponding to the pre-set specific identification number.

20. The direct dialing number registering method according to claim 3, wherein the selecting the pre-set specific identification number by a select operation is performed at the parent station in the direct dialing number registering mode.

21. The direct dialing number registering method according to claim 20, wherein after the pre-set specific identification number is selected, the inputting the direct dialing number for the child station defined by the pre-set specific identification number by an input operation is performed at the parent station.

22. The direct dialing number registration apparatus according to claim 6, wherein the selected means for selecting the pre-set specific identification number by a select operation is performed at the parent station in the direct dialing number registering mode.

23. The direct dialing number registration apparatus according to claim 21, wherein after the pre-set specific identification number is selected by the selecting means, the inputting means for inputting the direct dialing number for the child station defined by the pre-set specific identification number by an input operation is performed at the parent station.

* * * * *